(12) United States Patent
Pedersen et al.

(10) Patent No.: US 10,053,788 B2
(45) Date of Patent: Aug. 21, 2018

(54) PROCESS FOR MONITORING, PROTECTION AND SAFETY SHUT-DOWN OF AN ELECTROLYSER SYSTEM

(71) Applicant: Haldor Topsøe A/S, Kgs. Lyngby (DK)

(72) Inventors: Claus Friis Pedersen, Vanløse (DK); Lone Bech, Ringsted (DK); Thomas Heiredal-Clausen, Copenhagen Ø (DK); Niklas Bengt Jakobsson, Kågeröd (SE)

(73) Assignee: Haldor Topsoe A/S, Lyngby (DK)

( * ) Notice: Subject to any disclaimer, the term of this patent is extended or adjusted under 35 U.S.C. 154(b) by 430 days.

(21) Appl. No.: 14/763,226

(22) PCT Filed: Jan. 25, 2013

(86) PCT No.: PCT/EP2013/051478
§ 371 (c)(1),
(2) Date: Jul. 24, 2015

(87) PCT Pub. No.: WO2014/114348
PCT Pub. Date: Jul. 31, 2014

(65) Prior Publication Data
US 2015/0329980 A1  Nov. 19, 2015

(51) Int. Cl.
*C25B 15/02* (2006.01)
*C25B 1/10* (2006.01)

(52) U.S. Cl.
CPC ............ *C25B 15/02* (2013.01); *C25B 1/10* (2013.01)

(58) Field of Classification Search
CPC ..................................................... C25B 15/02
See application file for complete search history.

(56) References Cited

U.S. PATENT DOCUMENTS

| | | | |
|---|---|---|---|
| 4,169,775 A | * | 10/1979 | Kuo ........................ C25B 1/46 204/229.7 |
| 2005/0209800 A1 | | 9/2005 | Rusta-Sallehy et al. |
| 2009/0014326 A1 | | 1/2009 | Berriah et al. |
| 2009/0325014 A1 | | 12/2009 | Newkirk |
| 2011/0240483 A1 | | 10/2011 | Tremblay et al. |

FOREIGN PATENT DOCUMENTS

SU           1024528 A      6/1983
WO    WO 2011/137916 A1   11/2011

* cited by examiner

*Primary Examiner* — Nicholas A Smith
(74) *Attorney, Agent, or Firm* — Blank Rome LLP (57) ABSTRACT

The invention concerns a process for monitoring failure situations related to feed and/or purge flow in electrolyzer cells, stacks or systems, said monitoring process being combined with appropriate actions to be taken in case of such failure situations, wherein (a) the current and/or the voltage are monitored and controlled over a single cell, over all the cells or over one or more selected cells in a stack or a system of stacks, (b) in case the current, the voltage or the ratio between voltage and current crosses its pre-defined threshold value, a failure mode is detected and communicated to the control system, and c) the voltage levels of the system are adjusted to be within safe limits (safe-mode limits).

12 Claims, 6 Drawing Sheets

PROCESS FOR MONITORING, PROTECTION AND SAFETY SHUT-DOWN OF AN ELECTROLYSER SYSTEM

Figure 1:
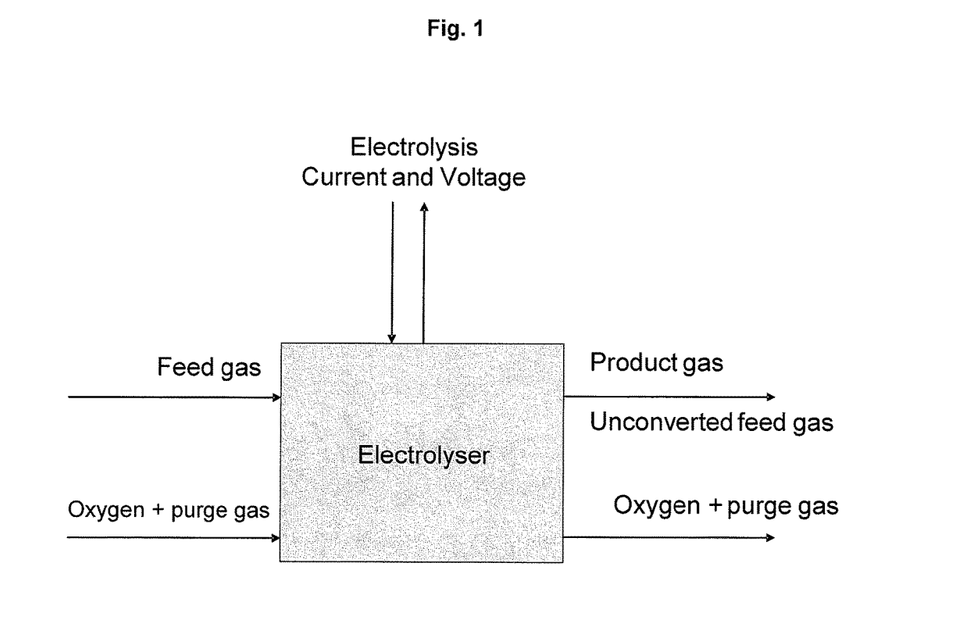
FIG. 1 shows the principle behind the electrical failure detection and electrical safety shut-down mechanisms of electrolyser systems according to the invention.

The present invention relates to the control and safety shut-down of electrolyser systems with special emphasis on solid oxide electrolyser cell (SOEC) systems. More specifically, the invention concerns electrical failure detection and electrical safety shut-down mechanisms of electrolyser systems to be activated in case that the supply of feed or purge gas to the system is unintentionally reduced or interrupted; see FIG. 1.

Electrolyser systems are typically used for producing hydrogen from water, but other chemicals can also be produced. As an example, solid oxide electrolysers (SOECs) can also produce CO from $CO_2$. The electrolyser uses electricity to split feed components into species with higher energy, e.g. water/steam into hydrogen and oxygen.

The present invention relates to efficient ways of detecting and handling electrolyser failure modes, which are otherwise potentially detrimental if no action is taken.

For an electrolyser, electricity is used to convert one molecule to another. A critical failure situation is when the chemical flow is changed unintentionally, while the feed of electrical power is not.

The present invention primarily consists in using changes in feed voltage and/or feed current to monitor a number of failure situations for an electrolyser system. More specifically, it has become possible to identify failures in feed gas and purge flows indirectly by detection of changes in electrolysis current and voltage and then take appropriate action. The advantage here is that current and voltage information is directly available from the same power supply which can also be used to take appropriate action to assure that the failure situation does not lead to permanent damage of the electrolyser system. In contrast, any extra monitoring is costly as regards both equipment costs, installation difficulties and loss of heat.

When an unusual current and voltage behaviour is detected, then the method according to the present invention enables suitable action to be taken in relation to
current and voltage over the stack
gas flow and
control of heaters.

The main situations to be detected and handled are
feed gas failure and
purge flow failure.

So the present invention consists in monitoring a feed or purge gas flow failure situation based on the current/voltage characteristics of the relevant cells or stacks. When a failure situation has been detected, appropriate action needs to be taken to protect the electrolysis system. One such action is to apply a moderate voltage and possibly a low current to the system. This protects the electrolysis cathode from oxidation, which in the case of SOEC means the nickel electrode. This protection method will be denoted "safe-mode". In this invention both the failure detection and the failure handling can be performed by the power supply unit of the system.

In connection with safe-mode the gas flows on both the feed side and the oxygen side can be controlled in ways which minimize the power supply energy consumption during safe-mode.

An alternative protective action could be to flush the feed side (nickel electrode) with a reducing "protection gas" to protect the electrode against oxidation. Such a protective gas could for example be 95% $N_2$ and 5% $H_2$ or CO. However, this scheme would require storage of protection gas and hence increase the cost of the system.

Thus the present invention relates to a process for monitoring failure situations related to gas flow in an electrolyser cell, electrolyser stack or electrolyser system, said monitoring process being combined with appropriate actions to be taken in case of such failure situations, wherein (a) the current and the voltage are monitored over a single cell, over all the cells or over one or more selected cells in a stack or a system of stacks, and (b) in case the ratio between voltage and current exceeds a pre-defined threshold value, a failure mode is detected and appropriate preventive action is taken to protect the system for example against electrode oxidation, said action being (c) to set the system in "safe-mode".

The "safe-mode" is characterised by the following step:
(1) The electrolysis voltage is set to a value of between 600 and 1500 mV per cell.

Additional protection may be obtained by one or more of the following actions:
(2) The potentially oxidizing electrodes are flushed with oxygen-free gases, (3) the electrolyser cell stack is cooled gradually either by flush gases or by passive heat loss from the system, and (4) the electrolysis voltage per cell is maintained over the cells and stacks at least until the temperatures of these are below the oxidation threshold of the critical materials, e.g. 400° C. for nickel electrodes.

Various systems and solutions are known in the field of controlling and monitoring electrolyser systems. For instance, US 2005/0209800 A1 describes computer-aided safety systems and methods suited for controlling an electrolyser cell module, based on monitoring one or more processes and operating parameters relating to the operation of the electrolyser cell module and evaluating whether at least one alarm threshold has been violated by said parameter(s). A method and a system for evaluating damage of a plurality of cells in an electrolyser by monitoring voltage threshold values is described in US 2009/0014326 A1. A procedure for electrode protection of electrolysis systems is known from WO 2011/137916 A1. Finally, in US 2009/0325014 A1 it is described how an electrolysis cell is controlled for operation under varying electrical power supply conditions.

In the following, the invention is described in more detail referring to the appended figures, in which:

FIG. 3 is an illustration of procedures to minimize the in-flux of oxygen molecules by:
(a) flushing the electrolysis system with inert gases. In the illustrated case, both the feed and oxygen sides, as well as the externals, are flushed with $N_2$, and (b) maintaining an inert gas at the feed side with a pressure, which is higher than both the pressure on the feed side and the pressure on external sides. In the illustrated case, $N_2$ is used as the inert gas.

FIG. 4 demonstrates two types of feed loss situations by the evolution of the current and voltage over a 10 cell SOEC stack. The stack initially performs CO electrolysis with stack potentials of 1.4 V/cell (a) and 1.7 V/cell (b), respectively. This gives rise to $CO_2$ conversions of approximately 35% (a) and 60% (b), respectively. Within a few minutes, the $CO_2$ feed flow of 0.4 Nm³/h is being replaced by a small flow of inert gas, more specifically 0.07 Nm³/h $N_2$. The oxygen side electrodes are continuously being flushed with 0.2 Nm/h $N_2$.

The present invention is based on the fact that the feed voltage, feed current and feed and purge gas concentrations are coupled. This coupling can ideally be described by the relation $$U = IR + \Sigma E_N \quad (1)$$

Here, U is the voltage over the considered system, I is the current, R is the resistance and $\Sigma E_N$ is the sum of the respective Nernst potentials of the electrochemical cells connected in series. The coupling to the reactant and product concentrations follows by combination with the Nernst equation, see equation (3) below. The system may consist of a single electrochemical cell, ensembles of cells or a device with cells, for example a stack of cells or integrated units of stacks, including e.g. electrical connectors. For each cell, the Nernst potential is the equilibrium electrical potential, which balances the chemical potential difference between the electrodes at zero current (see Carl H. Hamann, Andrew Hamnett & Wolf Vielstich, "Electrochemistry", John Wiley & Sons, Inc. (2007)).

For an electrolysis reaction, which involves transfer of n electrons between the electrodes of an electrochemical cell, the net reaction can be written in the general form:

$$\sum_{i,react} v_i X_i \xrightarrow{ne^{\pm}} \sum_{j,prod} v_j Y_j \quad (2)$$

and the Nernst equation states:

$$E_N = E^0 + \frac{RT}{nF} \ln\left(\frac{\prod_{j,prod} a(Y_j)^{v_j}}{\prod_{i,react} a(X_i)^{v_i}}\right) \quad (3)$$

Here, $a(X_i)$ and $a(Y_j)$ are the activities of the respective reactants ($X_i$) and products ($Y_j$), $v_i$ and $v_j$ are the stoichiometric coefficients, n is the number of electrons transferred between the electrodes per reaction, R is the gas constant, F is Faraday's constant, T is the temperature and $E^0$ is the equilibrium potential at standard conditions.

In the case of gases, the activity can be approximated by the partial pressure in units of the standard pressure, here 1 bar. As an example, for $CO_2$ electrolysis over one cell, (4)

the combination of equation (1) and (3) gives:

$$U = IR + E^0 + \frac{RT}{2F} \ln\left(\frac{p(CO)\sqrt{p(O_2)}}{p(CO_2)}\right) \quad (5)$$

The partial pressures $p(CO_2)$ and $p(CO)$ refer to the feed side, whereas $p(O_2)$ refers to the side where $O_2$ is released.

When the $CO_2$ feed supply is reduced, $p(CO_2)$ will decrease and, consequently, according to equation (5), the Nernst potential will increase and the ratio between potential and current will increase. In case the current is constant, the voltage will increase when the feed supply is reduced. Equivalent arguments apply for stacks containing cells connected in series.

Thus, if the stack is operated in a mode in which the current is kept constant and the feed supply is reduced, then it follows that the voltage will increase. Eventually, the voltage increases to a level where other processes start to contribute to the current. This type of breakthrough gradually destroys the electrolyser. The present invention proposes methods to detect the feed supply failure and take appropriate action to avoid the potentially detrimental effects.

As an alternative to constant current operation, this invention further proposes to operate the stack in a voltage limited mode. In this case, the current will, according to equation (1), decrease as a consequence of the rise of the Nernst potential (3), when the partial pressure of the feed gas decreases. The effect is demonstrated in example 2(a), below, for a case of feed gas loss during SOEC operation; illustrated in FIG. 4(a).

However, the present invention also takes into account the specific phenomenon that at high, yet commercially relevant levels of operational voltage, a breakthrough may occur, in which case the relation between current and voltage is no longer regulated solely by input and output gases as described for example in the case of $CO_2$ electrolysis in equation (5).

An important aspect of the present invention is to monitor and regulate the electrolyser system in such a way that events of non-linear breakthrough can be avoided. This can for example be done by operating the electrolyser system at a fixed voltage, while the current is monitored. If the current unexpectedly is severely reduced, this is interpreted as a sign of reduced feed supply, and if necessary the voltage is reduced to a safe level, the safe-mode voltage. The safe level is high enough to avoid oxidation of the nickel electrode, but at the same time low enough to avoid non-linear breakthrough in case of feed failure. Typically the safe level will be between 0.6 and 1.5 V per cell.

Alternatives would be to monitor flows directly or to monitor the pressure loss across the stack. An advantage is that access to direct flow and gas measurements may not be easily obtained for individual stacks in large systems.

Obviously other variants of this monitoring and regulating concept exist. Thus the current can be maintained at a fixed value while the voltage is monitored, and it is also possible to vary both the current and the voltage. It may generally be expressed this way: When the voltage to current ratio (U/I) suddenly increases, appropriate action is taken in order to limit both voltage and current with due regard to a possible protection of the cathode, which conveniently can be electrical (safe-mode).

Another failure situation which can be remedied by the method of the invention is the situation where purge air on the oxygen side disappears. For electrolysis systems there is a markedly increased risk of an explosion-like fire outbreak on the oxygen side, if very high concentrations of oxygen (well over 50%) are present in systems not designed specifically to comply with oxygen safety regulations. If pure oxygen is not used, electrolysis systems will typically be designed with purge gas (air, $N_2$ or $CO_2$) on the oxygen side to ensure that the oxygen concentration at the outlet is below specified safety limits (e.g. 23%).

The control mechanism as described here further offers the possibility of handling the disappearance of purge gas on the oxygen side. This would mean that the concentration of oxygen increases, whereby the Nernst potential (3) increases. For fixed voltage, the current will decrease as a consequence of equation (1). More generally, by suitable adjustment of shut-down limits the system will shut down if the concentration of oxygen exceeds a selected critical limit.

Alternative ways of handling these failures exist. Flow measuring devices could be placed in front of the relevant stacks and appropriate shut-down mechanisms could be used, if the monitored flow went beyond certain limits. This solution however has the drawback that flow controllers would have to be placed at room temperature, which is a major drawback, for example for SOEC systems operating at temperatures around 800° C. Furthermore, a large number of flow monitors will be necessary to monitor the flows of all relevant stacks in large systems.

Alternatively, pressure loss measurements could be used as an indication of the flow. These measurements however only give an indirect and potentially inaccurate monitoring of the flow. If for example the pressure loss changes over a stack (due to mechanical ageing related changes), the ratio between flow and pressure loss is changed. Pressure indicators, having the advantage of being able to measure at "hot" places in the system by feeding out signals from the pressure indicators, will then lead to a heat loss which reduces the efficiency of the electrolyser system.

An additional feature of this invention is that proper flushing schemes can also protect an SOEC system in case of electrical power failure. To protect the parts which can potentially be oxidized (e.g. Ni) of an SOEC stack from oxidation during emergency shut-down it is important that any oxygen molecules are removed from potentially oxidizing materials. As previously mentioned this can for example be obtained by applying a safe-mode voltage across the stack to allow any oxygen ions on the feed side (cathode) to be transported through the electrolyte to the other side (anode).

In order to use this scheme during power failure a further aspect of the invention relates to methods of minimizing the in-flux of oxygen molecules to the feed side of the stack during emergency shut-down. This will reduce the current drawn in "safe-mode" and hence reduce the power dissipated by the current source. This will again reduce the size of a possible stored power back-up necessary to maintain the safe-mode operation in case of power failure.

Figure 3A:
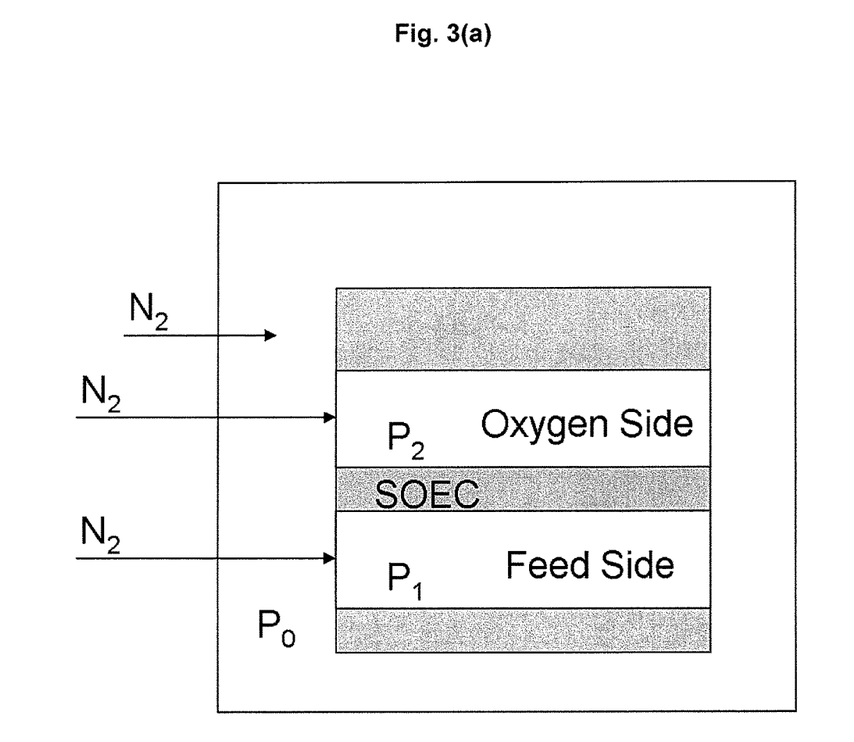

Minimizing the in-flux of oxygen molecules can be done by various methods:
1) to flush the stack with inert and oxygen-free gases on the feed side and possibly also on the oxygen side and the external interface (stack sides) to avoid oxygen from entering the feed side through cracks and holes. FIG. 3(a) illustrates an example of this protection method.
2) to maintain an inert gas at the feed side, and to assure that the pressure on the feed side is higher than the pressure on the oxygen side and on the external sides; see FIG. 3(b) for an illustration.

The invention is described in more details in the following examples.

EXAMPLE 1

The invented shut-down procedure for the protection of the cell stack in case of feed supply failure has been used in a test system. The procedure used is based on the fact that any failure in the feed supply to the stack causes a marked current decrease and/or voltage increase. When this situation occurs, the system is set in "safe-mode" with a pre-defined moderate safe-mode voltage applied (typically of the order of 1V per cell to protect against oxidation), while the electrodes are flushed with $N_2$ to protect them from excessive product concentrations. The implementation of the two phases of the procedure is described below.

1. Indicators of Feed Supply Failure

The current and the voltage over the cells are monitored via the parameters of a guide program. When a certain limit is exceeded, i.e. by a current decrease below a given value, then the system is set in "safe-mode". The limit is defined from the actual working voltage, e.g. as a certain percentage of the current observed over the last hour at a fixed voltage and flow.

2. Actions to Apply "Safe Mode"

In "safe mode" the set points for voltage (and current) prevent a too large current from passing through the stack. At the same time pure $N_2$ is passed over both electrodes. For a 10 cell stack $N_2$ purge levels of 60 l/h are used for both the feed side and the oxygen side electrodes.

Figure 2:
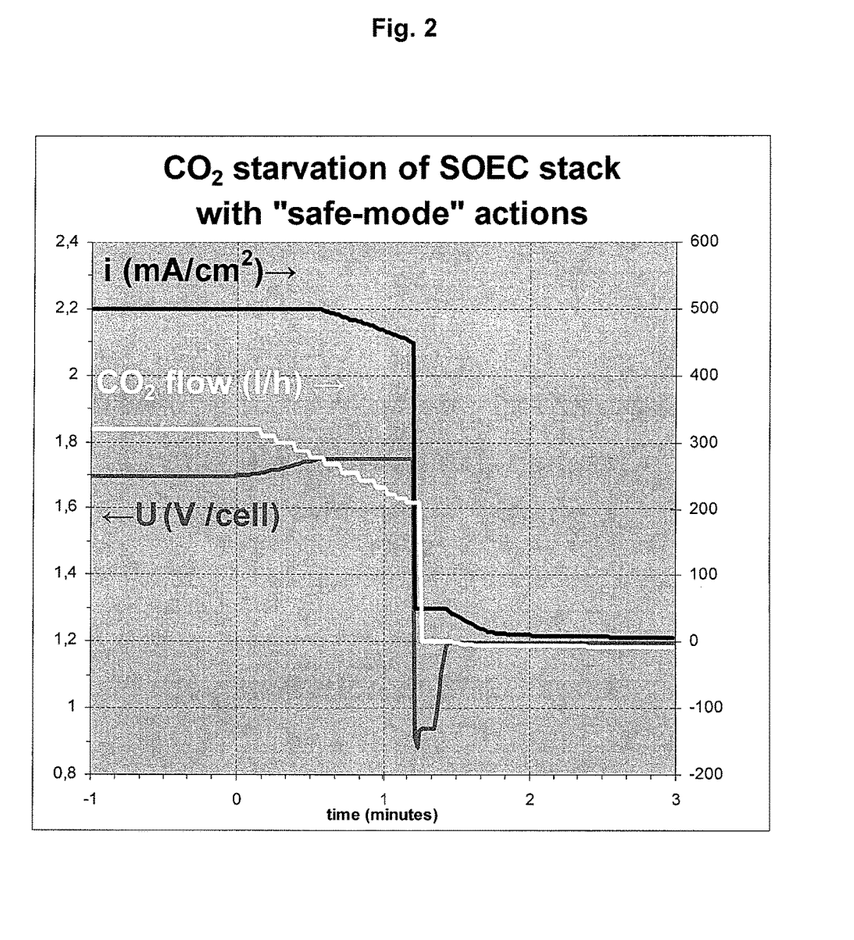
FIG. 2 shows an example of how the invented procedure for monitoring and protection of electrolysis systems can be implemented. In this case, an SOEC stack with 10 cells is used for $CO_2$ electrolysis. The applied stack voltage corresponds to 1.6 V/cell and the current density of 50 mA/cm² corresponds to 70% conversion of the $CO_2$ feed flow of 0.32 Nm³/h. The current and voltage are monitored and "safe-mode" actions are triggered when the current drops below 90% of the set-point value, which in this case happens when the feed flow reduces to 0.2 Nm³/h. The detection triggers the pre-defined safe-mode actions, which here dictate new set-points for the current (5 A) and voltage (1.2 V/cell). Furthermore, the feed supply is cut off and the electrodes are purged with 0.06 Nm³/h $N_2$.

The total applied voltage is calculated from the number of cells in the stack. For the case illustrated in FIG. 2, the safe-mode voltage was 1.2 V/cell, and with 10 cells, the total safe-mode voltage is 12 V. To reduce the maximum power dissipated by the system, a current limitation of 50 mA/cm² was furthermore implemented. With an active cell area of 100 cm², this corresponds to a total current of 5 A.

Figure 3B:
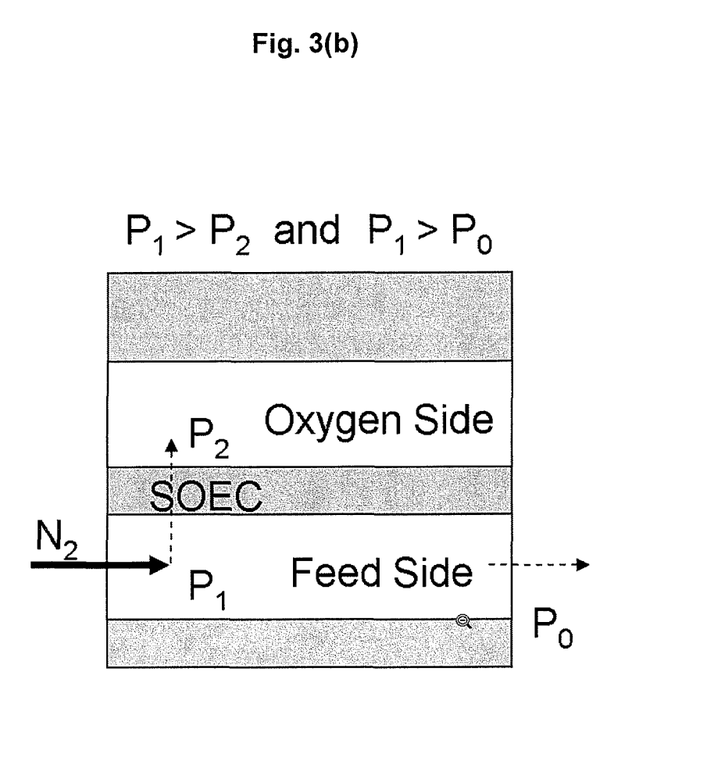

An interesting operation mode is one in which safe-mode voltages are applied simultaneously with keeping a certain overpressure on the feed side; see e.g. the illustration in FIG. 3(b). This can ensure a very low current draw on safe-mode by practically blocking oxygen from entering the feed side, which is inhibited by the gas flow in the opposite direction, from high to low pressure.

The safe-mode can also be used in other situations where it is desired to obtain the best possible stack protection, for example in controlled shut-down or in controlled startup/heat-up.

EXAMPLE 2

Figure 4A:
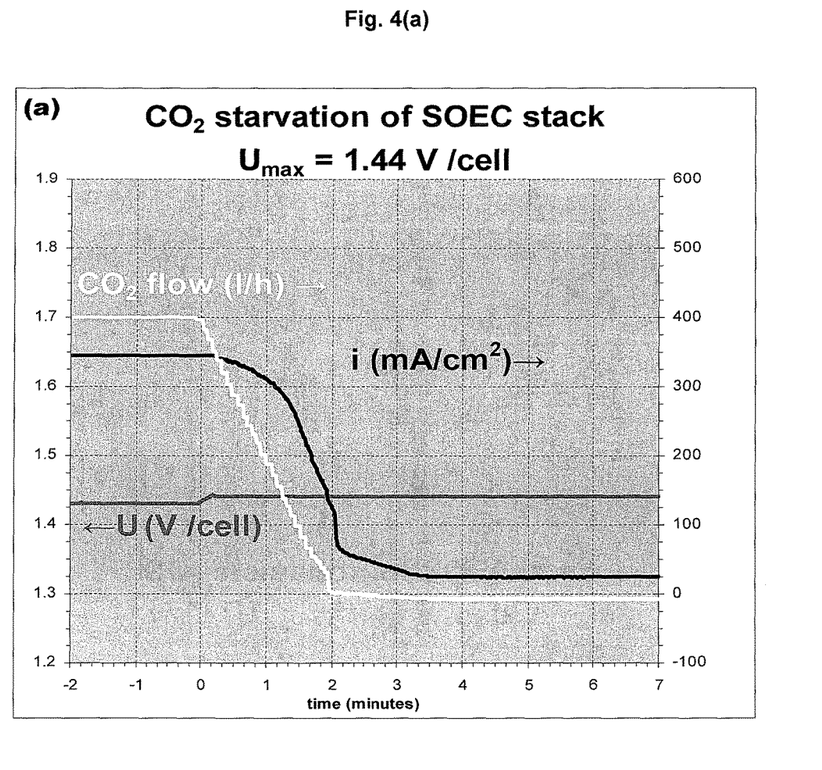
Figure 4B:
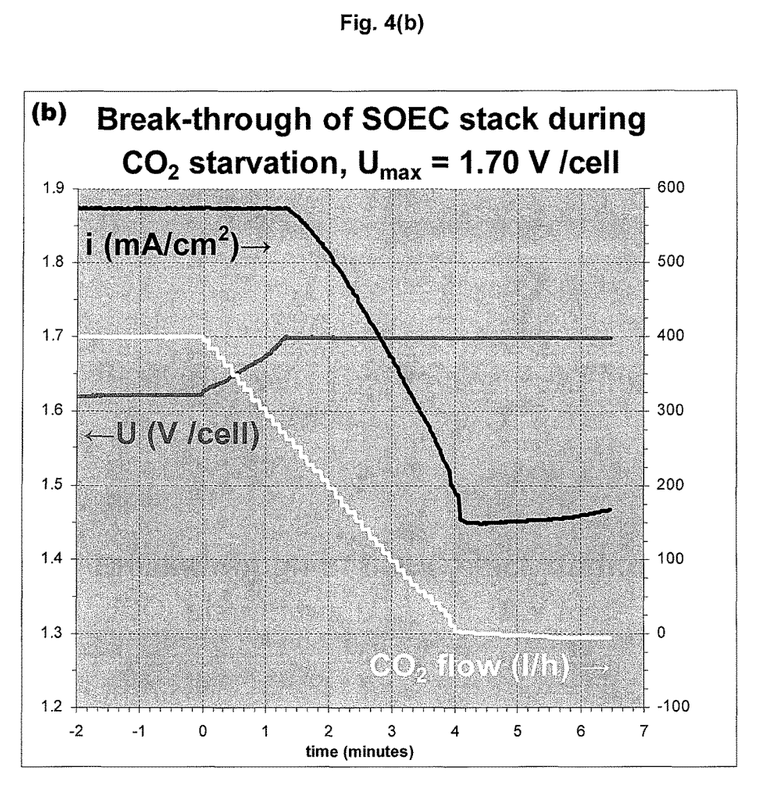

The potentially detrimental situations, which may occur when the feed supply fails during electrolysis operation, is illustrated in FIG. 4. Two cases of $CO_2$ electrolysis on a 10 cell SOEC stack are shown. The operation conditions are chosen in order to obtain conversions of 35% (a) and 60% (b), respectively. In both cases, the $CO_2$ feed flow drops from 0.4 Nm³/h to zero within a few minutes. The high conversion example demonstrates a potentially detrimental break-through, which is not seen in the low conversion example.

For the case demonstrated in FIG. 4(a), where the current draw is approximately 345 mA/cm², the voltage limitation of about 1.4 V per cell has the effect that the current through the stack decreases quickly as the $CO_2$ flow decreases. About a minute and a half after the $CO_2$ flow has ceased, the current has reached a stable level at approximately 25 mA/cm², which is close to the leak current of the stack. The leak current refers to the current level obtained through the stack at operation temperature and safe-mode voltage, when both sides are flushed with inert gases.

Thus the interruption of the $CO_2$ flow has resulted in a shut-down of the SOEC process without any noticeable additional current draw through the stack being observed.

In the case demonstrated in FIG. 4(b), the applied voltage initially increases to maintain the current draw at 575 mA/cm$^2$, while the $CO_2$ flow disappears. When the voltage reaches the upper limit of 1.7 V per cell, the current begins to decrease, but the development reverts already at approximately 150 mA/cm$^2$, which is remarkably higher than the leak current. The subsequent raise in current, which occurs despite the fact that no $CO_2$ is available for the electrolysis process, is an obvious indication that other processes are taking over, generating current through the stack. Thus the only slightly increased stack voltage (1.7 V per cell compared to 1.4 V per cell) makes the SOEC stack enter a destructive phase when the $CO_2$ feed vanishes.

The invention claimed is:

1. A process for monitoring failure situations in electrolyser cells, stacks or systems and taking preventive action, comprising
   (a) monitoring and controlling current and/or voltage over a single stack, over all stacks, or over one or more selected stacks in an electrolyser system, with a control system also adapted to:
      (1) monitor at least one of feed gas and purge gas flow in the single stack, in all the stacks or in a selected stack in the electrolyser system, and
      (2) take preventive action comprising flushing potentially oxidized electrodes with oxygen-free gases, gradually cooling electrolyser cells, stacks or systems by flush gases or by passive heat loss, or maintaining the electrolysis voltage per cell over the cells and stacks, at least until cell temperatures are below the oxidation threshold of the electrolyser cell electrodes,
   (b) monitoring or controlling the current and the voltage, and, when a ratio between voltage and current crosses a pre-defined threshold value, detecting and communicating a failure mode to the control system,
   c) adjusting the voltage levels to be within safe limits (safe-mode limits) by applying a protective voltage of between 600 mV and 1500 mV per cell across each cell in the stack, and optionally taking at least one of the following preventive actions:
      (1) flushing potentially oxidizing electrodes with oxygen-free gases,
      (2) gradually cooling electrolyser cells, stacks or systems, either by flush gases or by passive heat loss from the system, and
      (3) maintaining the electrolysis voltage per cell over the cells and stacks, at least until cell temperatures are below the oxidation threshold of the electrolyser cell electrodes.

2. A process according to claim 1, wherein the electrolyser is a solid oxide electrolyser cell (SOEC).

3. A process according to claim 1, wherein the protective voltage is applied until the temperature of the electrolyser cells, stacks or system is below 500° C.

4. A process according to claim 1, comprising operating said electrolyser within an applied voltage range between 600 mV and 1500 mV per cell, in which case no changes in the applied voltage are necessary in case of failure.

5. A process according to claim 1, further comprising monitoring both current and voltage to detect failures and to apply protective voltage levels in case of failure through the use of a common power supply unit.

6. A process according to claim 1, wherein the preventive action includes a reduction of the flow rate of oxygen-containing gases to the cells, stacks or system.

7. A process according to claim 1, wherein the preventive action includes flushing with a protective gas over one of or both electrodes of the electrolyser for a period of time to protect them from excessive product concentrations or to flush out oxygen.

8. A process according to claim 1, wherein current through the cells is limited to below 0.1 A/cm$^2$.

9. A process according to claim 1, wherein the preventive action includes flushing with a protective gas around the cells, stacks or system until the temperature of the cells, stacks or system is below 500° C.

10. A process according to claim 9, wherein the protective gas is a non-oxygen-containing inert gas, comprising $N_2$.

11. A process according to claim 9, wherein a feed side, oxygen side and surroundings of the stack are all flushed with an oxygen-free inert gas until the temperature of the stack is below 500° C.

12. A process according to claim 11, wherein an inert gas is applied to the feed side at a pressure higher than that on the oxygen side and/or that on the external interfaces.

* * * * *